(12) United States Patent
Torilli et al.

(10) Patent No.: US 10,874,235 B2
(45) Date of Patent: Dec. 29, 2020

(54) HAND-HELD PORTABLE AIR CONDITIONER AND BEVERAGE INSULATION SYSTEM

(71) Applicants: Michael Torilli, Medway, MA (US); Timothy M. Downing, Hayward, CA (US)

(72) Inventors: Michael Torilli, Medway, MA (US); Timothy M. Downing, Hayward, CA (US)

(*) Notice: Subject to any disclaimer, the term of this patent is extended or adjusted under 35 U.S.C. 154(b) by 72 days.

(21) Appl. No.: 16/127,392

(22) Filed: Sep. 11, 2018

(65) Prior Publication Data

US 2019/0075951 A1  Mar. 14, 2019

Related U.S. Application Data

(60) Provisional application No. 62/558,245, filed on Sep. 13, 2017.

(51) Int. Cl.
| | |
|---|---|
| *A47G 19/22* | (2006.01) |
| *F25D 31/00* | (2006.01) |
| *F24F 5/00* | (2006.01) |
| *A47J 41/00* | (2006.01) |
| *F25D 17/04* | (2006.01) |

(52) U.S. Cl.
CPC ........ *A47G 19/2288* (2013.01); *F24F 5/0017* (2013.01); *F25D 31/007* (2013.01); *A47J 41/0044* (2013.01); *F24F 2221/12* (2013.01); *F25D 17/04* (2013.01); *F25D 2400/12* (2013.01)

(58) Field of Classification Search
CPC ............... A47G 19/2288; F24F 5/0017; F25D 2400/12; F25D 17/04; A47J 41/0044
See application file for complete search history.

(56) References Cited

U.S. PATENT DOCUMENTS

| | | | | |
|---|---|---|---|---|
| 1,972,800 | A * | 9/1934 | Shelor | F25D 7/00 62/314 |
| 5,207,762 | A * | 5/1993 | Newman | F25D 17/06 62/419 |
| 5,699,669 | A * | 12/1997 | Gebhard | B67D 3/0009 165/47 |
| 5,953,933 | A * | 9/1999 | Cheng | F24F 5/0017 62/425 |
| 7,089,749 | B1 * | 8/2006 | Schafer | B60H 1/00264 62/3.2 |
| 9,555,949 | B1 * | 1/2017 | French | A47J 41/00 |

(Continued)

*Primary Examiner* — Kun Kai Ma
(74) *Attorney, Agent, or Firm* — Justin Lampel

(57) ABSTRACT

A portable air-conditioner system utilizing a removable pre-cooled beverage container is provided. The portable air conditioner system utilizing a removable pre-cooled beverage container has a hollow cylindrical housing having an internal thermal material wherein the housing has an open top end for receiving, for example, a removable standard aluminum 12 ounce can, glass, plastic bottle or the like. The housing has an internal pathway system which transports cooled air produced from the removable pre-cooled beverage container out toward the user with the aid of a fan located at the bottom of the housing. In an embodiment, the internal pathway is preferably spiral, but may also be serpentine or another suitable design. An electronic charging docking station may recharge the fan.

15 Claims, 14 Drawing Sheets

(56) References Cited

U.S. PATENT DOCUMENTS

| | | | | |
|---|---|---|---|---|
| 2008/0245803 A1* | 10/2008 | Angelidis | ........... | A47J 41/0038 |
| | | | | 220/592.17 |
| 2012/0000923 A1* | 1/2012 | Powell | ............... | B65D 43/0212 |
| | | | | 220/780 |
| 2012/0080456 A1* | 4/2012 | Steininger | ............ | B65D 47/248 |
| | | | | 222/531 |
| 2014/0308414 A1* | 10/2014 | Bougdanos | ............. | A47J 31/18 |
| | | | | 426/425 |
| 2016/0367072 A1* | 12/2016 | Boone | ..................... | A47J 31/20 |
| 2018/0020854 A1* | 1/2018 | Kim | ................... | A47G 19/2272 |
| | | | | 62/457.9 |

* cited by examiner

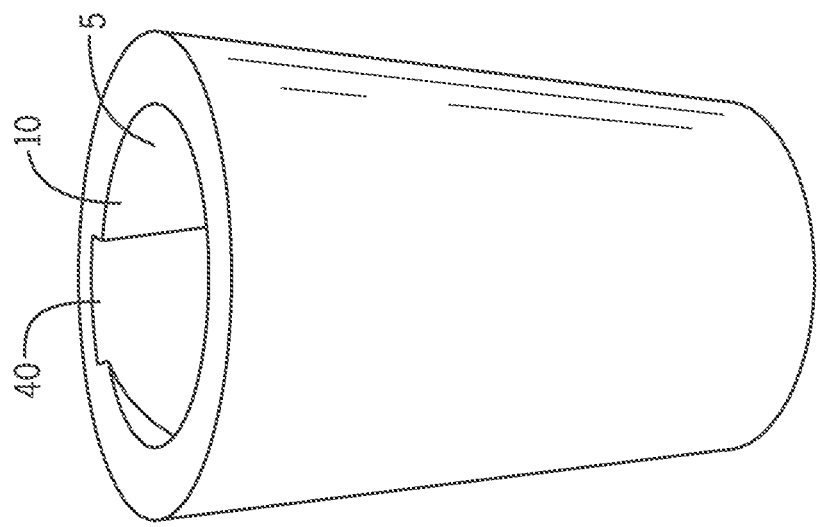
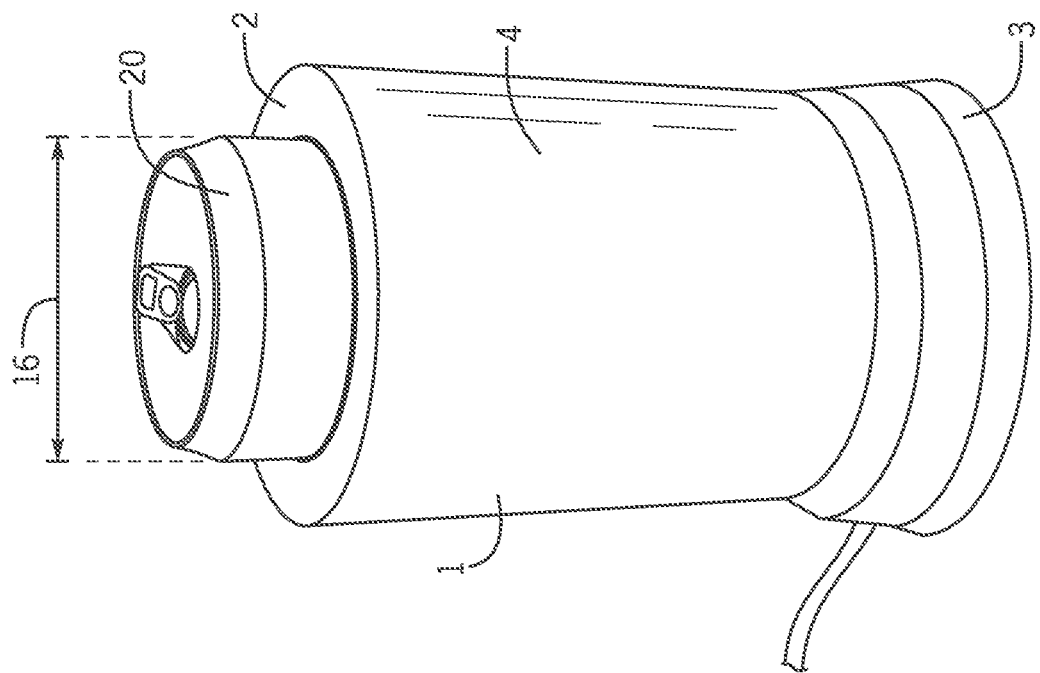

HAND-HELD PORTABLE AIR CONDITIONER AND BEVERAGE INSULATION SYSTEM

CROSS REFERENCE TO RELATED APPLICATIONS

The following application is a based on and claims the priority benefit of U.S. provisional application Ser. No. 62/558,245 filed Sep. 13, 2017 currently; the entire content of which is incorporated by reference.

BACKGROUND OF THE INVENTION

A portable air-conditioner system for cooling ambient air is provided. The portable air-conditioner system may utilize a removable pre-cooled beverage container (the beverage container may be, for example, a "cold can" or "cold bottle") or a pre-cooled slug. The portable air conditioner system utilizing a removable pre-cooled beverage container has a hollow cylindrical housing having an internal thermal material wherein the housing has an open top end for receiving, for example, a removable standard aluminum 12 ounce can, glass, plastic bottle or the like. The housing has an internal pathway system which transports cooled air produced from internal thermal material and/or the removable pre-cooled beverage container out toward the user with the aid of an attachable and detachable fan located, for example, at the bottom or top of the housing. In an embodiment, the internal pathway is preferably spiral, but may also be serpentine or another suitable design. The internal thermal material layer associated with the housing may cool the air and may restrict the unintentional loss of cooled air. In particular, the internal thermal material layer may be a passive thermal energy storage material (PTESM) gel, phase change material, water, glycol, blend or other. An electronic charging docking station may recharge the fan.

Over the years, attempts have been made to provide a portable air conditioner. For example, U.S. Publication No.: 2008/0245803 to Angelidis discloses a portable cooling system having a beverage container holding a cooled beverage or a digestable cooling element, and an air duct including an inlet and an outlet. During operation of the personal cooling system, an inner surface of the air duct contacts an outer surface of the beverage container. More particularly, a powered fan is coupled to the air duct, to draw outside air with an initial temperature into the inlet. Additionally, the powered fan is coupled to the air duct to pass the outside air through the air duct to thermally engage the outer surface of the beverage container, and to push the outside air through the outlet with a reduced temperature from said initial temperature.

Further, U.S. Pat. No. 5,953,933 to Cheng discloses a water container and cooling fan assembly including a fan motor base, a cylindrical housing mounted on the fan motor face and covered with a top cover, and a water container put inside the housing, the water container having a plurality of longitudinal turning angles defining with the housing a plurality of longitudinal wind passages through which induced currents of air from a fan in the fan motor base pass, top cover having a smoothly curved wind guide face on the inside adapted for guiding induced currents of air from the longitudinal wind passages to an exhaust port.

Still further, U.S. Publication No.: 2006/0123832 to Urfig discloses an air cooling device having a thermally insulated container being packed with encapsulated refrigerant and adapted to pass incoming air for cooling. The air cooling device has a housing adapted to accommodate the thermally insulated container and force the incoming air to flow inside the refrigerant-packed container against gravity to ensure a prolonged air cooling period. The encapsulated refrigerant is configured as a plurality of compacted frozen glycol balls serving as primary source of cooling for the incoming air. Air pockets are formed between the frozen glycol balls that serve as secondary source of cooling for the incoming air.

However, these patents and publications fail to describe a portable air conditioner utilizing a removable pre-cooled beverage container as is described in the present application. A need, therefore, exists for an improved portable air conditioner which utilizes a removable pre-cooled beverage container.

SUMMARY OF THE INVENTION

A portable air-conditioner system for cooling ambient air is provided. The portable air-conditioner system may utilize a removable pre-cooled beverage container (the beverage container may be, for example, a "cold can" or "cold bottle") or a pre-cooled slug. The portable air conditioner system utilizing a removable pre-cooled beverage container has a hollow cylindrical housing having an internal thermal material wherein the housing has an open top end for receiving, for example, a removable standard aluminum 12 ounce can, glass, plastic bottle or the like. The housing has an internal pathway system which transports cooled air produced from internal thermal material and/or the removable pre-cooled beverage container out toward the user with the aid of an attachable and detachable fan located, for example, at the bottom or top of the housing. In an embodiment, the internal pathway is preferably spiral, but may also be serpentine or another suitable design. The internal thermal material layer associated with the housing may cool the air and may restrict the unintentional loss of cooled air. In particular, the internal thermal material layer may be a passive thermal energy storage material (PTESM) gel, phase change material, water, glycol, blend or other. An electronic charging docking station may recharge the fan.

An advantage of the present portable air conditioner utilizing a removable pre-cooled beverage container is that the present portable air conditioner may utilize a standard 12 ounce can, glass or bottle in an embodiment.

Another advantage of the present portable air conditioner may be that the present device may have a built in rechargeable battery and printed circuit board with universal serial bus (USB) battery charging, light-emitting diode function indicators of fully charged, power on, low power, power switch, and various motor and blower blade speeds for low, medium and high output rates.

Yet another advantage of the present air conditioner utilizing a removable pre-cooled beverage container is that the present device may first be cooled in, for example, a cooler or refrigerator prior to use to even further provide a lasting cooling effect for both the removable pre-cooled beverage container and the user.

In yet another embodiment, the air conditioner may receive a pre-cooled slug instead of a removable pre-cooled beverage container (such as a can or bottle) wherein the slug may be a cylindrical-shaped piece of metal, thermal storage material, or other material with high thermal capacity to cool the air.

Still another advantage of the present air conditioner utilizing a removable pre-cooled beverage container is that the present portable air conditioner may provide cooled air to an individual.

Yet another advantage of the present air conditioner utilizing a removable pre-cooled beverage container is that the present portable air conditioner may have, in one embodiment, a specialized spiral hollow pathway system which provides for the cooling of air via contact with the internal thermal material and transports cooled air to a user by utilizing a fan. Other embodiments may utilize an alternative shaped hollow pathway system such as, for example, a serpentine shaped hollow pathway system.

And another advantage of the present portable air conditioner is that the present device may act similar to a standard beverage Koozie® device in maintaining and insulating the pre-cooled nature of the beverage container (such as a can or bottle) by limiting conduction, convention or radiation.

Another advantage of the present portable air conditioner utilizing a pre-cooled beverage container is that the present device may keep a removable beverage container cool.

An advantage of the present portable air conditioner is that the present device may provide an aesthetically appealing covering for a beverage can, glass, bottle or the like.

Still another advantage of the present portable air conditioner is that the present device may have a locking mechanism, such as, for example, a press-fit, a snap-fit, a magnetic, a pin and slot, a threaded, a gear rack and ratchet, or a spring-loaded locking mechanism, for temporarily securing the fan and/or the removable pre-cooled beverage container to the housing.

And still another advantage of the present portable air conditioner is that the present portable air conditioner is light weight, durable and reusable.

Still another advantage of the present portable air conditioner is that the present portable air conditioner may have a cap which allows a user to trap cool air within the housing of the device so as to further cool the can or bottle. The cap may also allow a user to select beverage containers of different sizes.

For a more complete understanding of the above listed features and advantages of the present portable air conditioner utilizing a removable pre-cooled beverage container reference should be made to the detailed description and the detailed drawings. Further, additional features and advantages of the invention are described in, and will be apparent from, the detailed description of the preferred embodiments.

BRIEF DESCRIPTION OF THE DRAWINGS

FIG. 1 illustrates a perspective view of a first embodiment wherein a removable beverage container (pre-cooled or not pre-cooled) is inserted into an interior of the housing of the device and wherein the device is being charged.

FIG. 2 illustrates a perspective view of the first embodiment wherein the removable beverage container is removed from the housing of the device and wherein the interior of the device is partially visible.

DETAILED DESCRIPTION OF THE PREFERRED EMBODIMENTS

Figure 4:
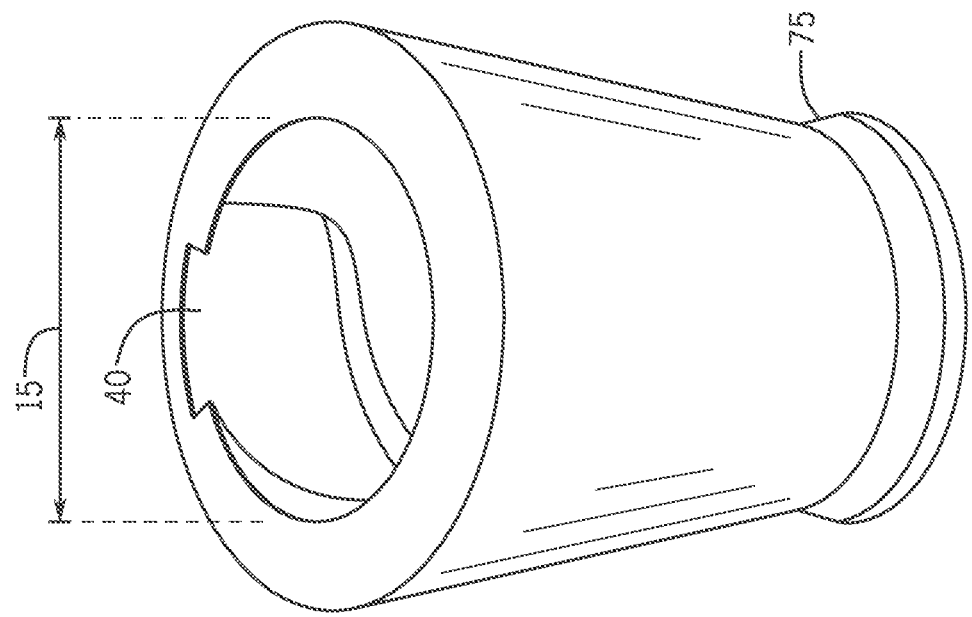
FIG. 4 illustrates a perspective side view of the first embodiment of the device.

A portable air-conditioner system for cooling ambient air is provided. The portable air-conditioner system may utilize a removable pre-cooled beverage container (the beverage container may be, for example, a "cold can" or "cold bottle") or a pre-cooled slug. The portable air conditioner system utilizing a removable pre-cooled beverage container has a hollow cylindrical housing having an internal thermal material wherein the housing has an open top end for receiving, for example, a removable standard aluminum 12 ounce can, glass, plastic bottle or the like. The housing has an internal pathway system which transports cooled air produced from internal thermal material and/or the removable pre-cooled beverage container out toward the user with the aid of an attachable and detachable fan located, for example, at the bottom or top of the housing. In an embodiment, the internal pathway is preferably spiral, but may also be serpentine or another suitable design. The internal thermal material layer associated with the housing may cool the air and may restrict the unintentional loss of cooled air. In particular, the internal thermal material layer may be a passive thermal energy storage material (PTESM) gel, phase change material, water, glycol, blend or other. An electronic charging docking station may recharge the fan.

Referring first to FIG. 1, in an embodiment, a portable air conditioner 1 for utilizing a removable pre-cooled beverage container 20 is provided. The portable air conditioner 1 may have a top 2, a bottom 3, a generally cylindrical side 4 and an interior 5 (FIG. 2) accessible through an opening 10 at the top 2 of the housing. In particular, an opening 10 located at the top 2 of the air conditioner 1 may provide access to the interior 5 of the air conditioner 1. The device 1 is suitable for holding a beverage container 20 such as a can or bottle. In one embodiment of a method of use, the device 1 (including an internal thermal material 50 as described below) may be first cooled in, for example, a cooler filled with ice, ice packs, gel packs or the like or the device may also be cooled in a refrigerator prior to use to even further provide a lasting cooling effect for both the removable pre-cooled beverage container 20 and the user. In an embodiment, the portable air conditioner 1 may be pre-cooled in a cooler, refrigerator or freezer prior to use. Once cold, the device 1 especially suitable for cooling the removable pre-cooled (or non-pre-cooled) beverage container 20, the user (as described below) or both the removable pre-cooled beverage container 20 and the user. After the device 1 is pre-cooled the device 1 may be attached to a removable fan 75 (as discussed below).

In an embodiment, the opening 10 of the device 1 may have a diameter 15 (FIG. 4) which is substantially similar to (or even slightly smaller than) a diameter 16 (FIG. 1) of a typical twelve once removable beverage container 20 so that the removable pre-cooled beverage container 20 may snugly and removable fit within the opening 10 of the device 1. In particular, in an embodiment, the diameter 15 of the device 1 may be slightly smaller than the diameter 16 of the typical twelve ounce (or smaller) can 20 so that the device 1 may slightly stretch (being made of a stretchable material) so as to snugly surround the removable pre-cooled beverage container 20. More specifically, the housing of the device 1 may be made of a stretching material which may slightly stretch in diameter 15 to accept various sized cans, glasses or bottles 20.

Figure 15G:
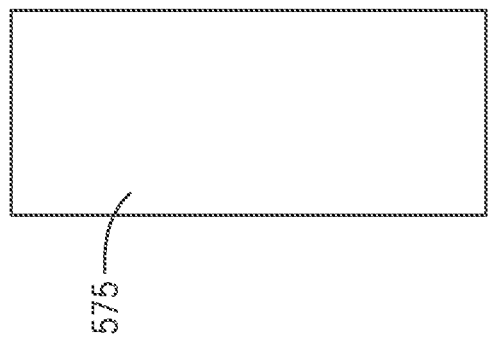
FIG. 15G illustrates the slug.
Figure 15B:
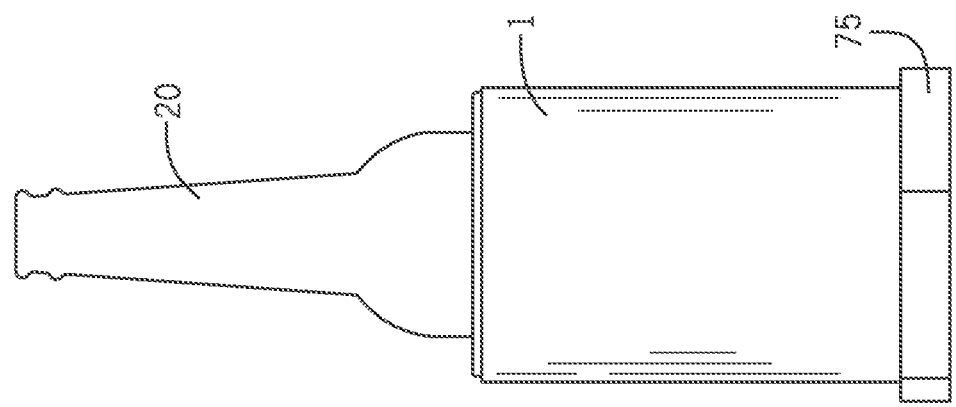
FIGS. 15A-15D illustrate views of air conditioner securing a can or a bottle.
Figure 15A:
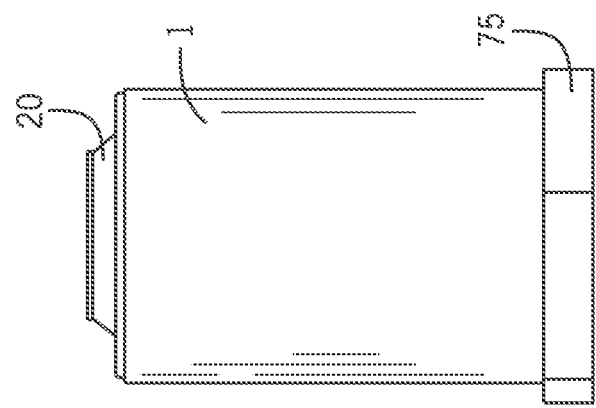
Figure 15E:
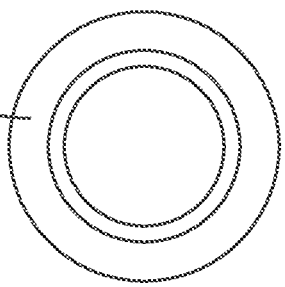
FIGS. 15E-15F illustrate an optional locking ring mechanism of the beverage container to accommodate smaller beverage containers.
Figure 15F:
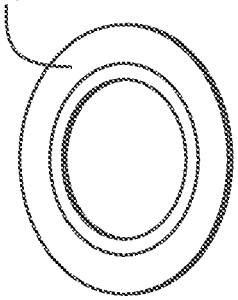
Figure 15D:
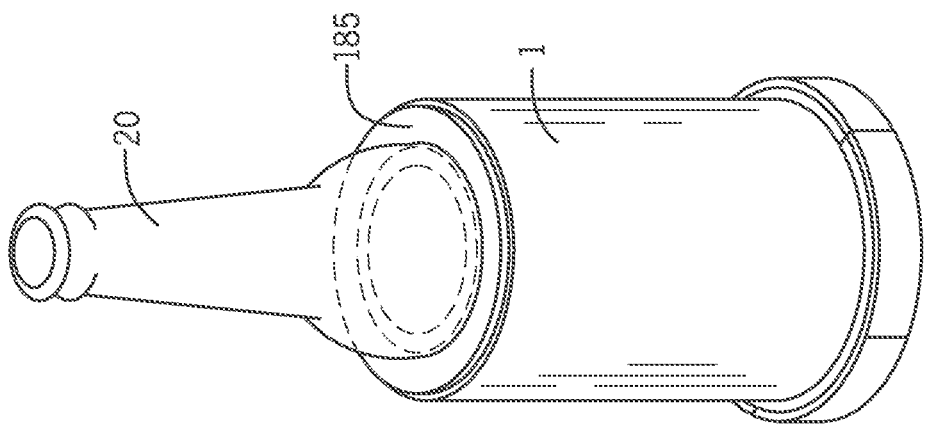
Figure 15C:
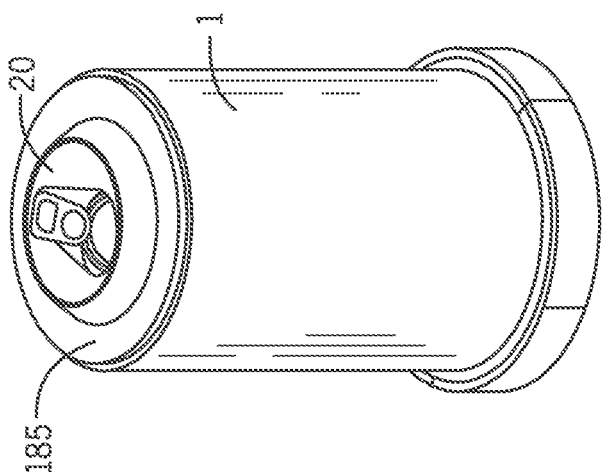
Figure 16:
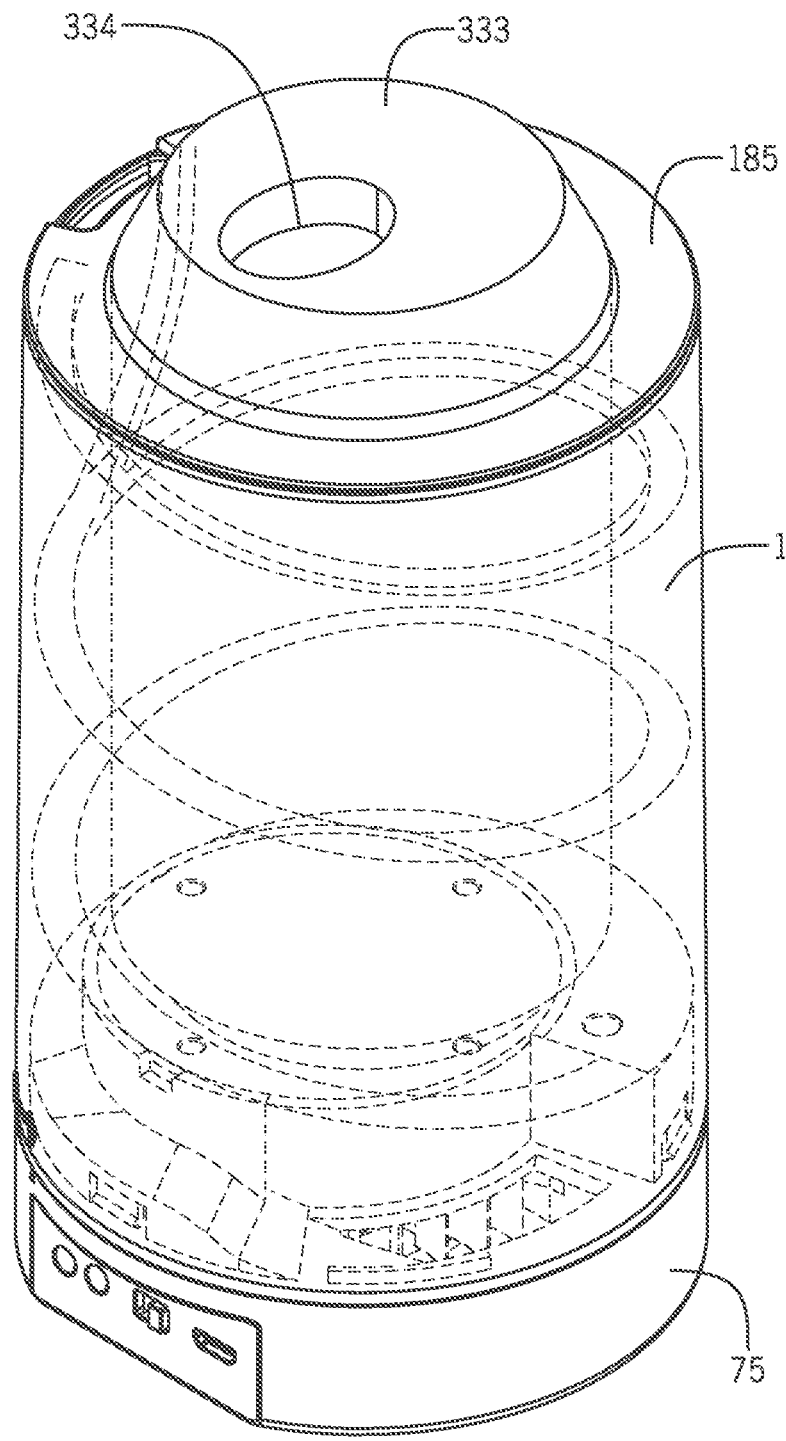
FIG. 16 illustrates a transparent view of the device in an embodiment.

Further, a top locking ring 185 (FIGS. 15E-F) may be utilized to center the various beverage container 20 within the device 1. The top locking ring 185 may also be made of a stretchy material to accommodate varying container diameters. In an embodiment, the top locking ring 185 may be inserted onto the top 2 of the device 1 and may snap into place to narrow the diameter 15 of the opening 10 of the device 1 to accommodate smaller beverage containers 20. In one embodiment, the opening 10 of the device 1 is slightly larger than a typical twelve once removable beverage container 20 and the device 1 does not stretch.

In an embodiment, the device 1 may also receive a 'slug' 575 (FIG. 15G) instead of a removable pre-cooled beverage container 20 wherein the slug 575 may be a cylindrical-shaped piece of metal, a thermal storage material, or other material with high thermal capacity to cool the air. In an embodiment, the slug 575 is pre-cooled and of approximately the same diameter and size as the pre-cooled beverage container 20 so that the slug 575 may be used instead of the pre-cooled beverage container 20. Inserting the slug 575 into the opening 10 of the device 1 may therein prevent cooled air from quickly escaping from the large opening 10 at the top 2 of the device 1 and may instead force the cooled air 99 to exit through the smaller opening 40 which also directs the cooled air toward the user in a controlled manner. The slug 575 may increase the cold storage to make the cooling effect last longer. The slug 575 generally lacks any openings in an embodiment.

In an embodiment, the air conditioner 1 may utilize an internal thermal material 50 (for example, FIGS. 3 and 13) which may provide cold energy to the moving air 99 located within the device 1. In an embodiment, the exterior housing material of the device 1 may be made from, for example, an insulation material whereas the internal thermal material 50 may be selected from a material which cools the air 99 and the removable pre-cooled beverage container 20. The thermal material 50 may also cool the surface of the internal air flow channel which cools the high flow rate air 99 directed toward the user. The internal thermal material 50 may be, for example, sealed within the housing 1 and may be a passive thermal energy storage material (PTESM) such as a gel, phase change material, water, glycol, blend or other. In an embodiment, the internal thermal material 50 may prevent cooled air 99 radiating from the removable pre-cooled beverage container 20 from exiting the container 1 in a location other than the top opening 40 of FIG. 4 (as discussed below). As a result, the removable pre-cooled beverage container 20 remains cooled and substantially all the cold radiating air 99 radiating from the removable pre-cooled beverage container 20 is utilized to cool the user as an air conditioner 1.

Figure 3:
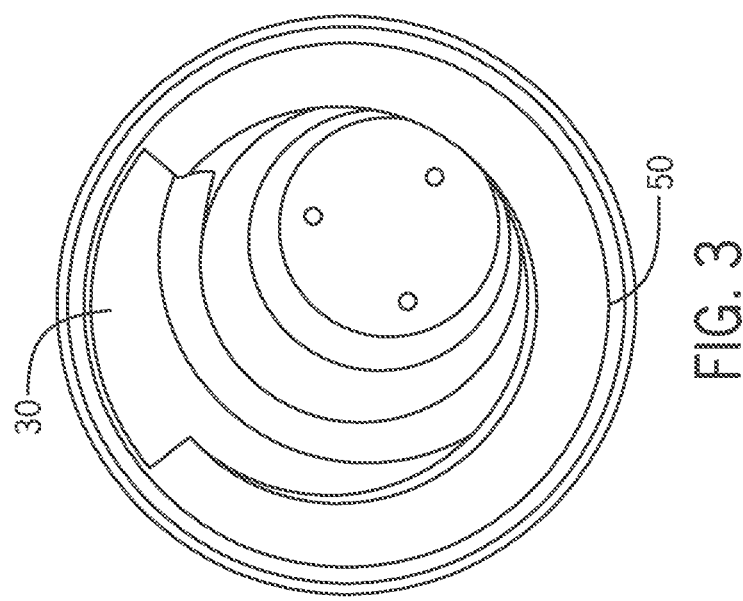
FIG. 3 illustrates a perspective view of the first embodiment of the device wherein the interior spiral hollow pathway system is partially visible.
Figure 11:
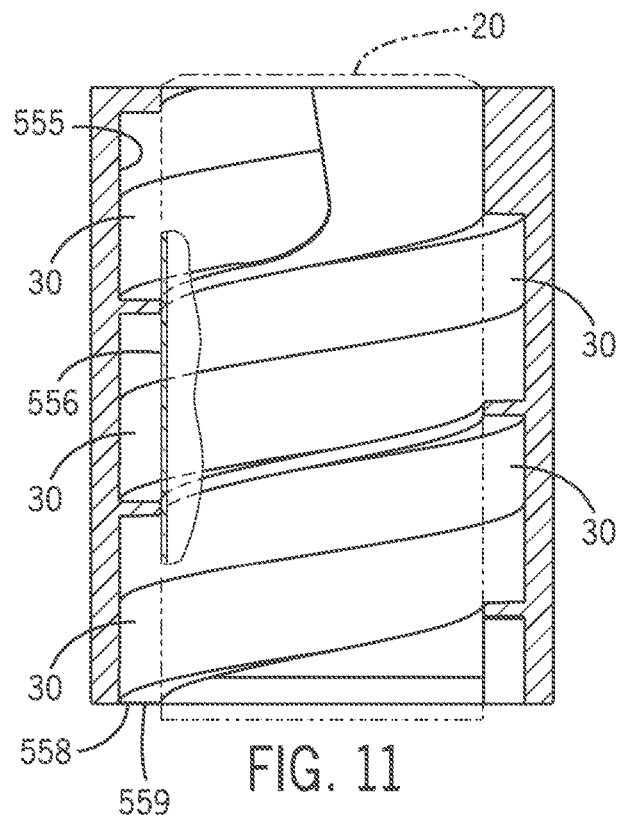
FIG. 11 illustrates a cross section of the air conditioner in an embodiment without the thermal material.
Figure 12:
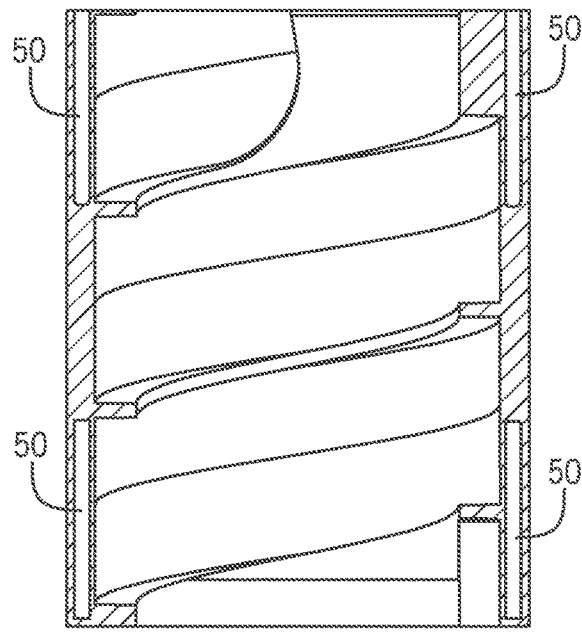
FIG. 12 illustrates a cross section of the air conditioner in an embodiment wherein a thermal energy storage material is utilized.

Referring now to FIG. 3, in an embodiment, a generally hollow spiral passageway 30 may be provided. The generally hollow spiral passageway 30 may wrap around the interior 5 of the air conditioner 1 (and therefore, around the removable pre-cooled beverage container 20 when the removable pre-cooled beverage container 20 is inserted into the housing of the device 1). More specifically, the beverage container 20 may act as one of the two side walls of the generally hollow spiral passageway 30 when the beverage container 20 is inserted into the device 1. For example, if a beverage container 20 such as a can is inserted into the interior 5 of the device 1 (as shown in FIG. 11) the generally hollow sealed spiral passageway 30 would then have a first interior wall 555 and a top 557 and a bottom divider 557 formed by the housing 1 and a second interior wall 556 formed from the removable beverage container 20 itself. Thus, the air 99 is directed through the generally hollow sealed passageway 30 can only move up toward the opening 40 of the device 1 and toward the user when the beverage container 20 is located within the interior 5 of the device 1. More specifically, air 99 does not escape from any space between the second interior wall 556 and the remaining three walls 557, 557 and 555 of the passageway 30 when the beverage container 20 is placed in the device 1. In an embodiment, the bottom 558 of the generally hollow sealed spiral passageway 30 has an opening 559 so that the fan 75 can force the air 99 up through the generally hollow sealed spiral passageway 30 starting at the bottom 558 of the generally hollow sealed spiral passageway 30.

In alternative embodiments, a different shape air pathway may be utilized such as a serpentine shaped hollow pathway system. As stated above, the generally hollow spiral passageway 30 may allow cooled air 99 which naturally radiates from the removable pre-cooled beverage container 20 to be moved through the interior 5 of the device 1 and ultimately out of the device 1 and toward a user so as to cool the user. In an embodiment, the cooled air 99 exiting the interior 5 of the device 1 may exit the interior 5 of the device 1 through the opening 40 (FIG. 2) located at the top 2 of the device 1. Typically, a user would hold the device 1 in his/her hand and would face the opening 40 of the top 2 toward his/her face for a cooling effect.

Figure 6A:
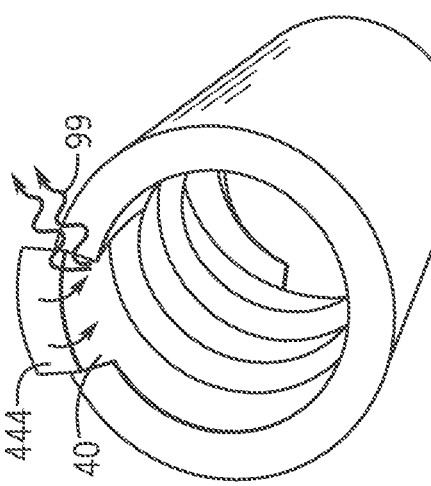
FIGS. 6A-6B illustrate perspective and side views of embodiments of the device wherein the device has an optional movable cap and without the thermal material.
Figure 6B:
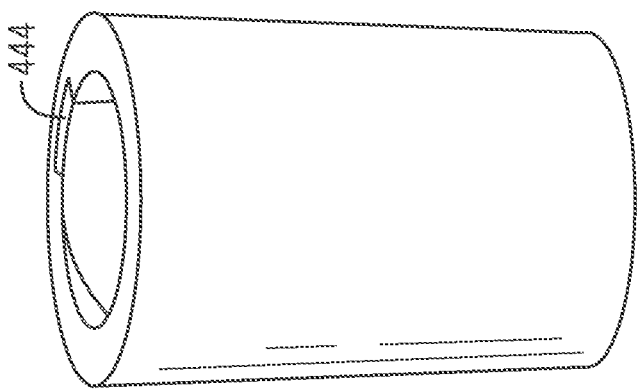
Figure 8A:
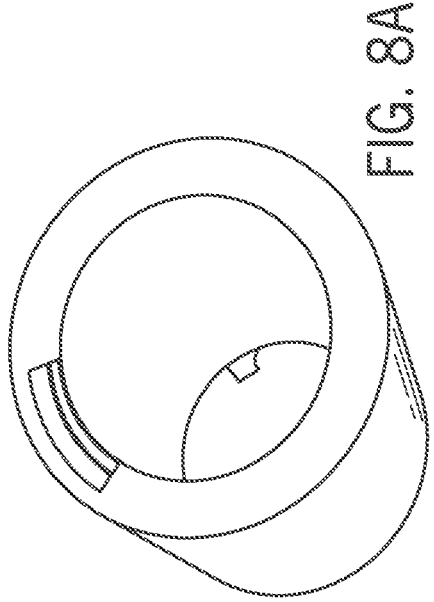
FIGS. 8A-8B illustrate perspective and side views of embodiments of the device wherein the device has an inner layer thermal material housing with external spiral.
Figure 8B:
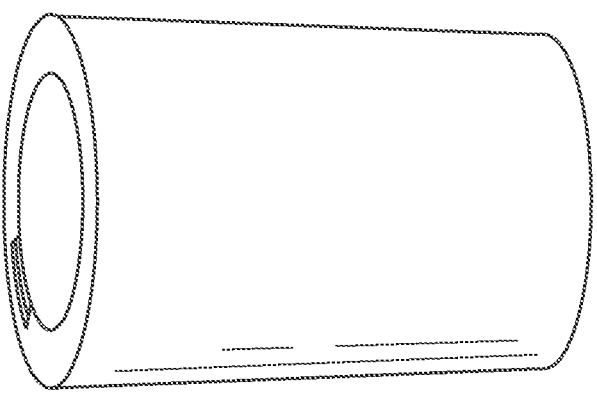

Referring now to FIGS. 6A and 6B, in one alternative embodiment, the top 2 of the device 1 may have a movable cap 444. The movable cap 444 may move from a first position (FIG. 6A) to a second position (FIG. 6B) by a hinge. In the first position (FIG. 6A), the opening 40 at the top of the housing 1 is exposed therein allowing the cool air 99 to exit from the beverage container 20 and the interior 5 of the device 1 toward the user to cool the user in hot weather. The user may optionally flip the movable cap 444 downward to the second position (FIG. 6B) to cover the opening 40 of the housing 1. When the opening 40 is covered as shown in FIG. 6B, the cool air 99 remains within the interior 5 of the device 1 and better cools the beverage container 20 instead of the user. Therefore, by closing the movable cap 444 (as shown in FIG. 6B) a user can decide that all of the cool air 99 generated by the device 1 gets directed toward the beverage container 20 to keep the beverage 20 colder or the user can alternatively decide to utilize some of the cooled air 99 to cool him/herself by selectively moving the movable cap 444 to the up position of FIG. 6A. In an embodiment, the opening 40 is off-set from the center of the device 1 and located at the top of the generally hollow spiral passageway 30.

Figure 10:
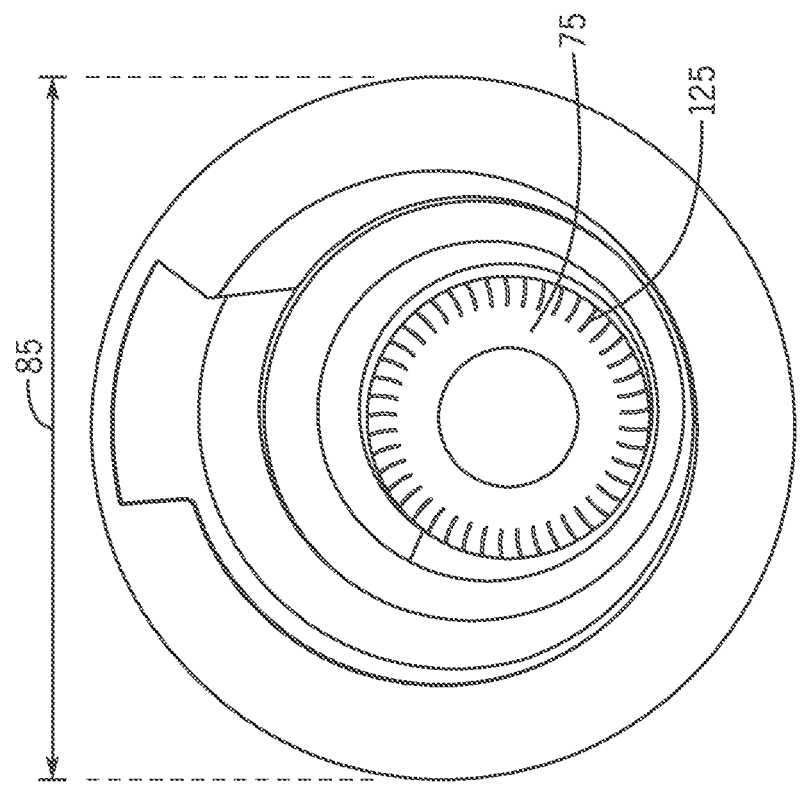
FIG. 10 illustrates an interior view of the device wherein the fan is visible at the bottom of the housing.
Figure 9:
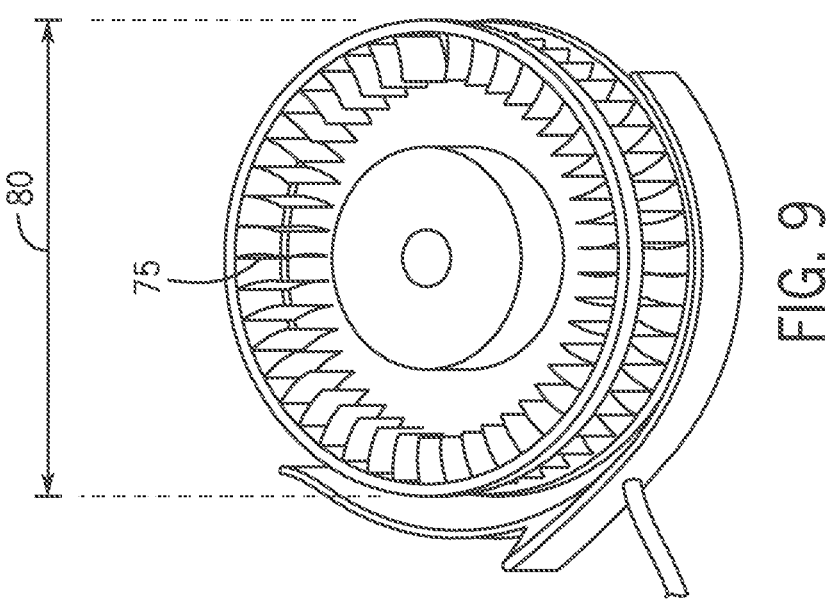
FIG. 9 illustrates a perspective view of the removable fan of the bottom of the portable air conditioner.

Referring now to FIGS. 9 and 10, in an embodiment, a fan 75 may be utilized with the device 1. In one embodiment, the fan 75 is electric, but in an alternative embodiment the fan 75 may be manual. The fan 75 may be temporarily located at, for example, the bottom 3 of the device 1. The fan 75 may have a diameter 80 substantially similar to the total diameter 85 of the air conditioner 1. The fan 75 may electrically force the cooled air 99 which naturally radiates from the removable pre-cooled beverage container 20 and into the generally hollow spiral passageway 30 out from the removable pre-cooled beverage container 20 and upward toward the user so as to cool the user.

In an embodiment, the fan 75 may temporarily dock with a charging unit 3 (FIG. 4) so as to charge the fan 75 when the device 1 is not in use. A battery that powers the fan 75 may also be recharged with a charging cable, such as a USB or micro-USB cable or the like. The fan 75 may have various settings allowing a user to select between, for example, high, medium or low forced air. Cooled air 99 created by the pre-cooled beverage container 20 and/or internal thermal material 50 is forced upward by the fan 75 and may therein cool the user once the cooled air 99 exits the opening 40. The fan 75 may also cool the user by circulating ambient air toward the user as fans typically do even without the aid of the pre-cooled beverage container 20. In an embodiment, the fan 75 may be a radial or centrifugal high pressure forced convection fan 75 used to transfer the cooled air 99 to the user.

In an embodiment, an opening 125 (FIG. 10) may be present at the bottom 3 of the air conditioner 1. The opening 125 at the bottom 3 of the air conditioner 1 may allow the fan 75 access to the interior 5 of the air conditioner 1 from the bottom 3 so as to allow the device 1 to force the cooled air 99 generated by the removable pre-cooled beverage container 20 or the internal thermal material 50 up to the top 2 and then out of the interior 5 of the air conditioner 1 through the opening 40 of the top 2 of the device 1 when beverage 20 is inserted into the device 1 or, the cooled air 99 may exit from the main opening 10 if a user elects to use the device 1 to cool him/herself as opposed to cooling a beverage 20. In an embodiment, the fan 75 may be detached from the bottom 3 of the air conditioner 1 (therein allowing the fan 75 to be removed from both the main device 1 and the charging unit 3) for repair and or replacement.

Figure 5:
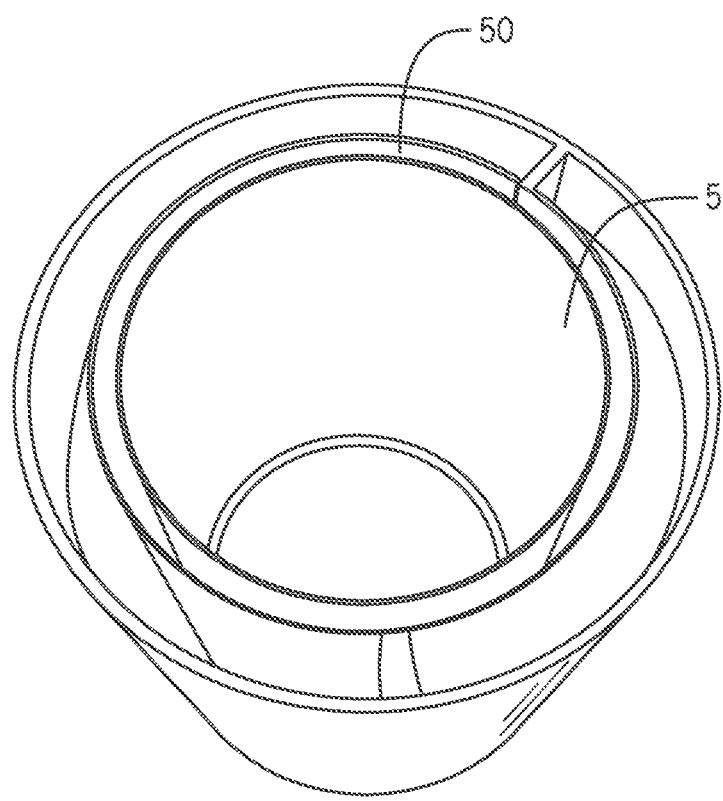
FIG. 5 illustrates a perspective interior view of the second embodiment of the device wherein an internal thermal material layer is utilized next to the removable pre-cooled beverage container location.
Figure 7A:
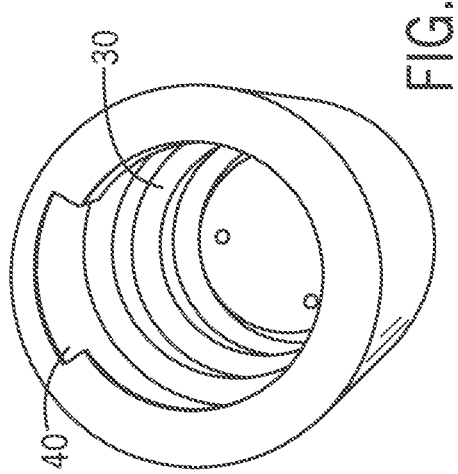
FIGS. 7A-7B illustrate perspective and side views of embodiments of the device wherein the device has the thermal material.
Figure 7B:
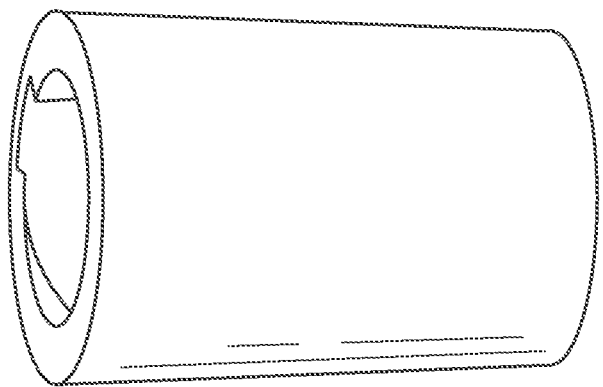

Referring now to FIG. 5, as stated above, in an embodiment, the device 1 may utilize the internal thermal material 50 in the interior 5 of the air conditioner 1 at a location directly surrounding the removable pre-cooled beverage container 20. More specifically, in this embodiment the internal thermal material 50 may be located between the removable pre-cooled beverage container 20 and the exterior 4 of the device 1, whereas in the alternative embodiment of FIG. 3, the internal thermal material 50 is located on the outside layer (the most distal layer) of the device 1.

In an embodiment, the bottom 3 of the housing 1 may have a locking mechanism which temporarily locks the bottom 3 of the housing 1 to the fan 75. In particular, the locking mechanism may allow the bottom 3 of the housing 1 to, for example, temporarily snap onto the fan 75 for utilizing the fan 75 and may allow the housing 1 to be removed from the fan 75 for cleaning, washing and replacing either the housing 1 or the fan 75.

Figure 17:
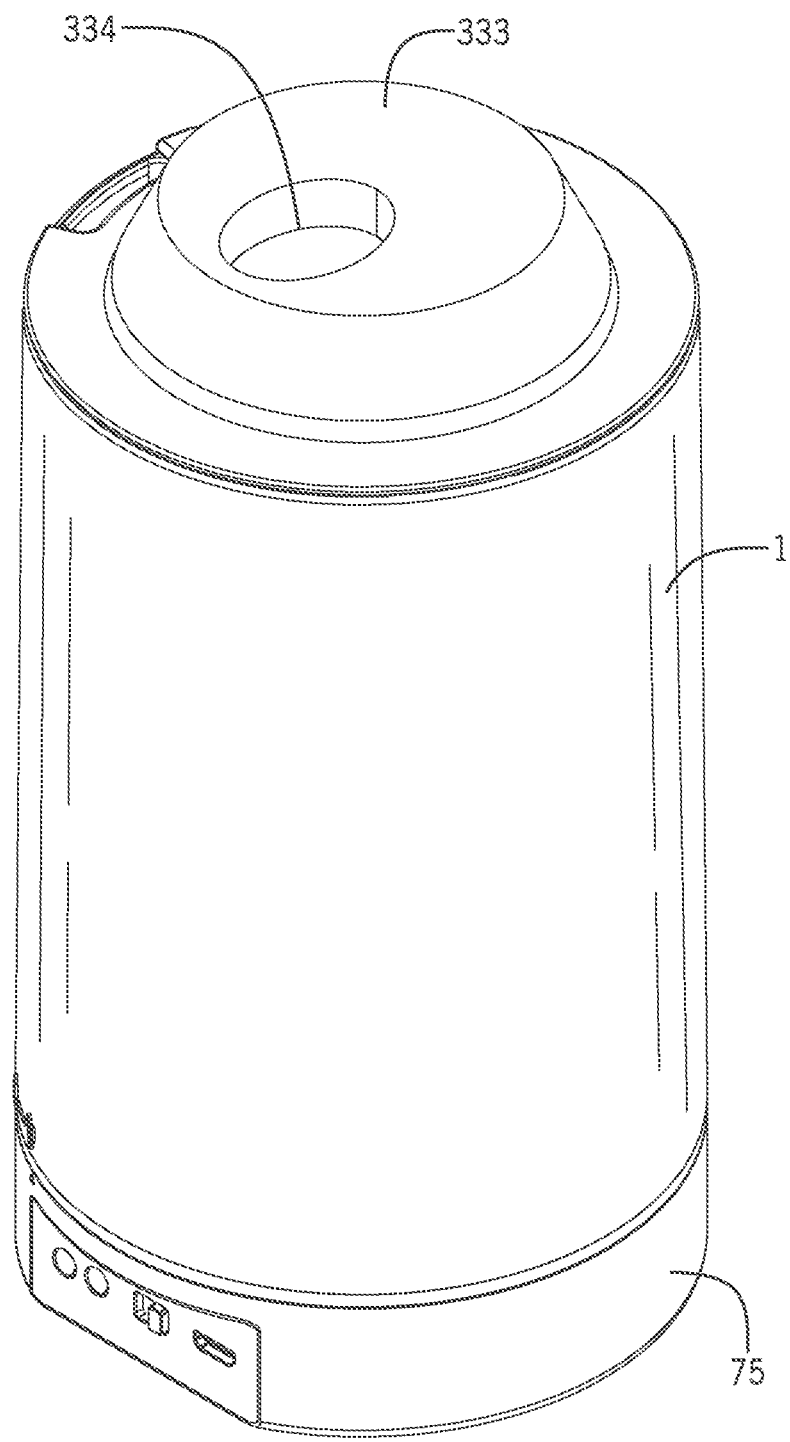
FIG. 17 illustrates a perspective view of the device in an embodiment wherein the second locking mechanism is utilized.
Figure 18:
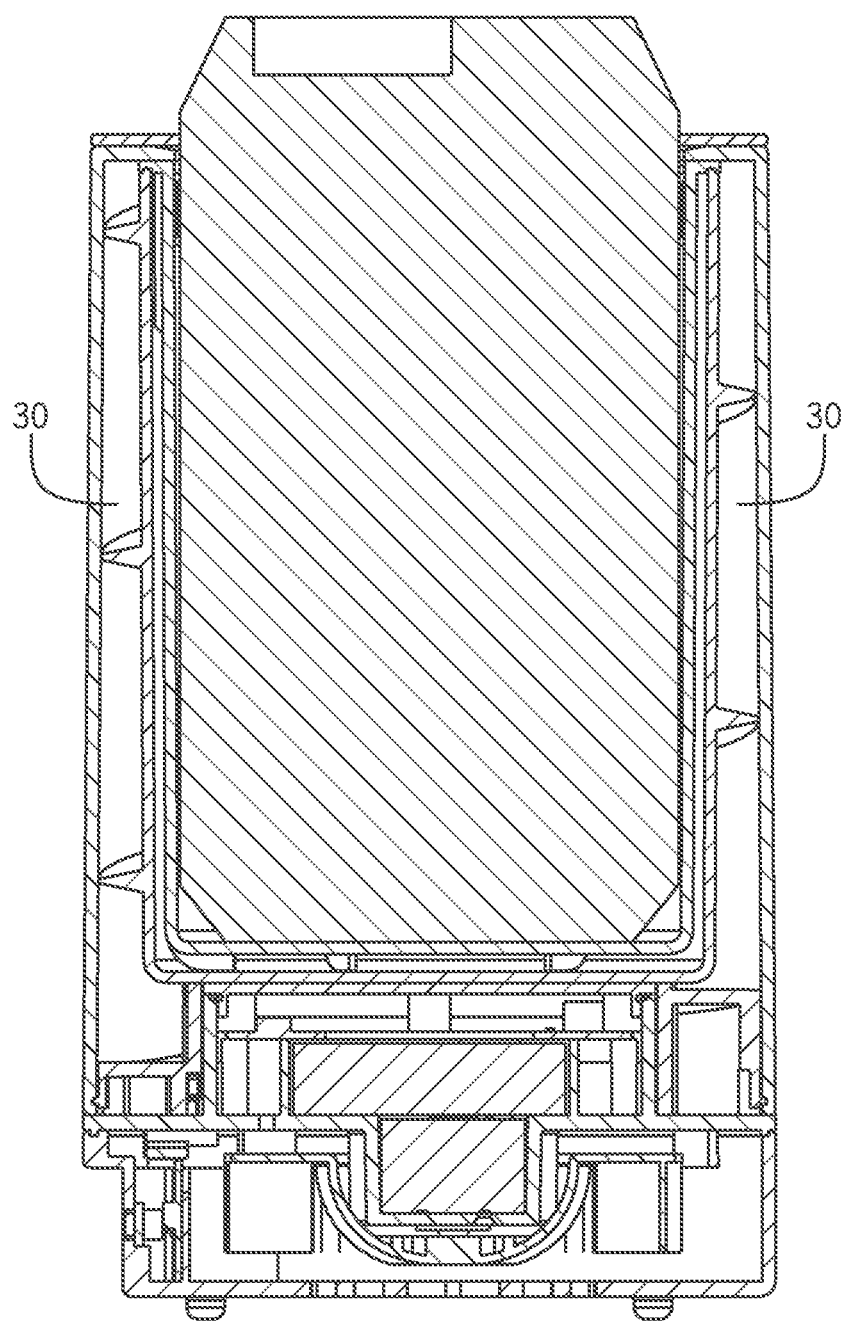
FIG. 18 illustrates a cross-sectional view of the device in an embodiment.

Referring now to FIG. 17, in an embodiment, in addition to or alternative to the ring 185 as described above, a second locking mechanism 333 may be utilized to temporarily lock the removable pre-cooled beverage container 20 into the interior 5 of the device 1. The second locking mechanism 333 may be, for example, a press-fit, a snap-fit, a magnetic, a pin and slot, a threaded, a gear rack and ratchet, or a spring-loaded locking mechanism which may allow a user to temporarily secure the removable pre-cooled beverage container 20 into the interior 5 of the device 1.

In an embodiment, the second locking mechanism 333 may completely cover the beverage 20 within the interior 5 of the housing 1 as is shown in FIG. 17. In an embodiment, the second locking mechanism 333 may have an opening 334 so that a user may drink from the beverage container 20 while the beverage container 20 is completely within the interior 5 of the device 1. When the beverage 20 is finished, the removable pre-cooled beverage container 20 may be removed and the device 1 may be stored or a new full removable pre-cooled beverage container 20 may be inserted into the interior 5 of the device 1.

Figure 13:
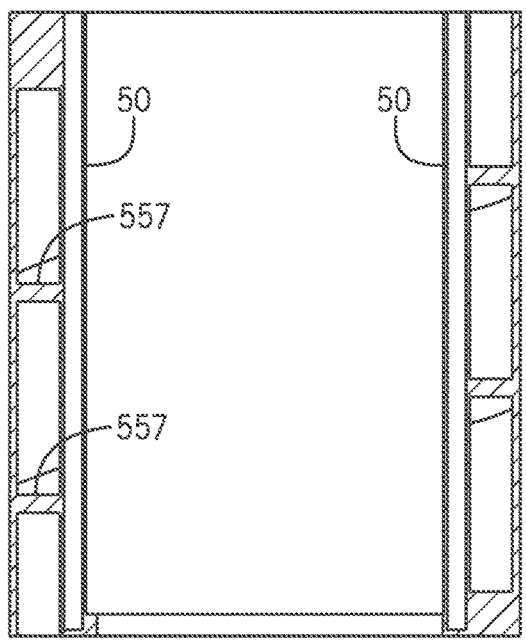
FIG. 13 illustrates a cross section of the air conditioner in an embodiment wherein thermal energy storage material is utilized extending the entire length of the device.
Figure 14A:
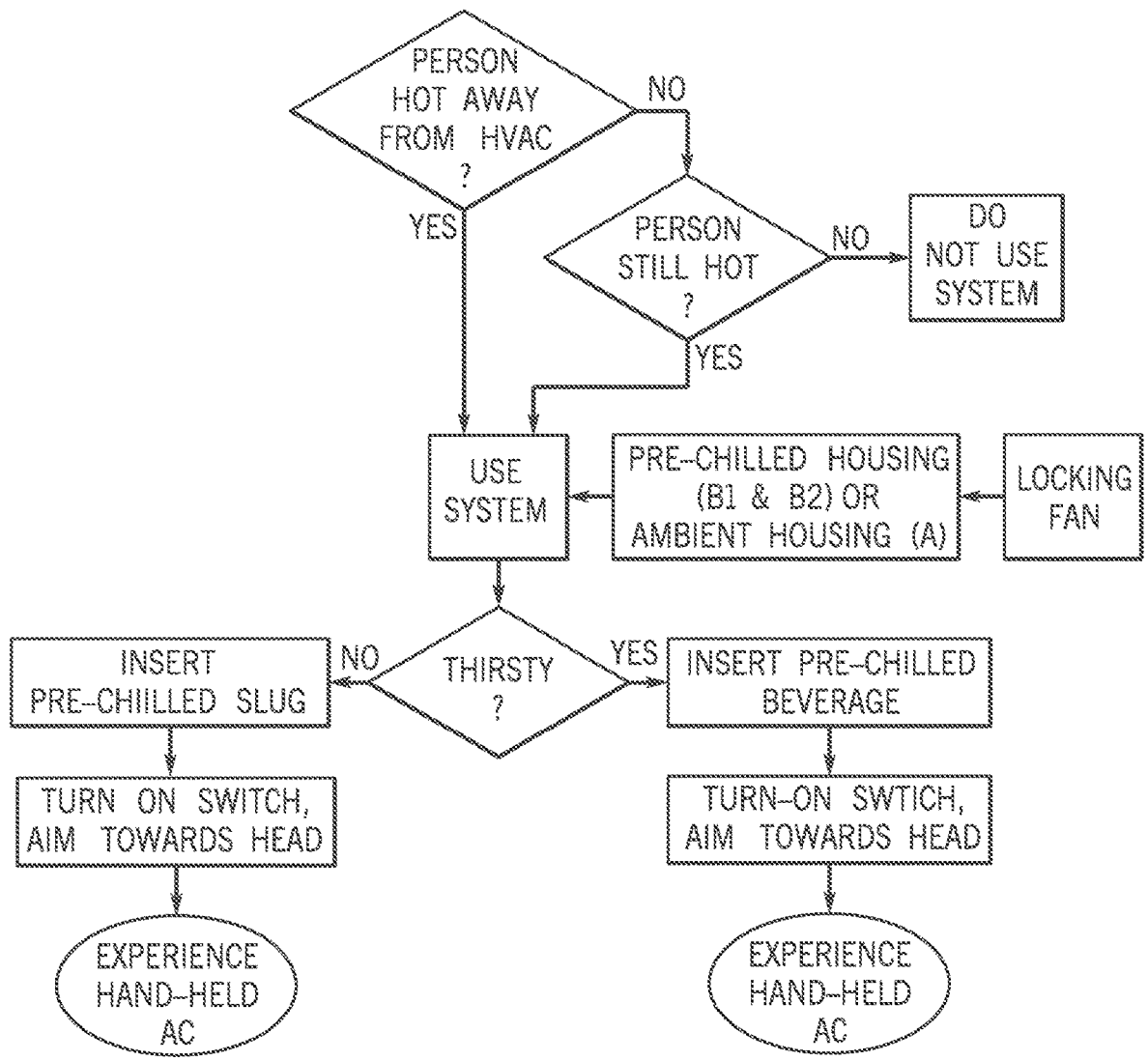
FIGS. 14A-14B illustrate flow charts of a system usage algorithm of the device.
Figure 14B:
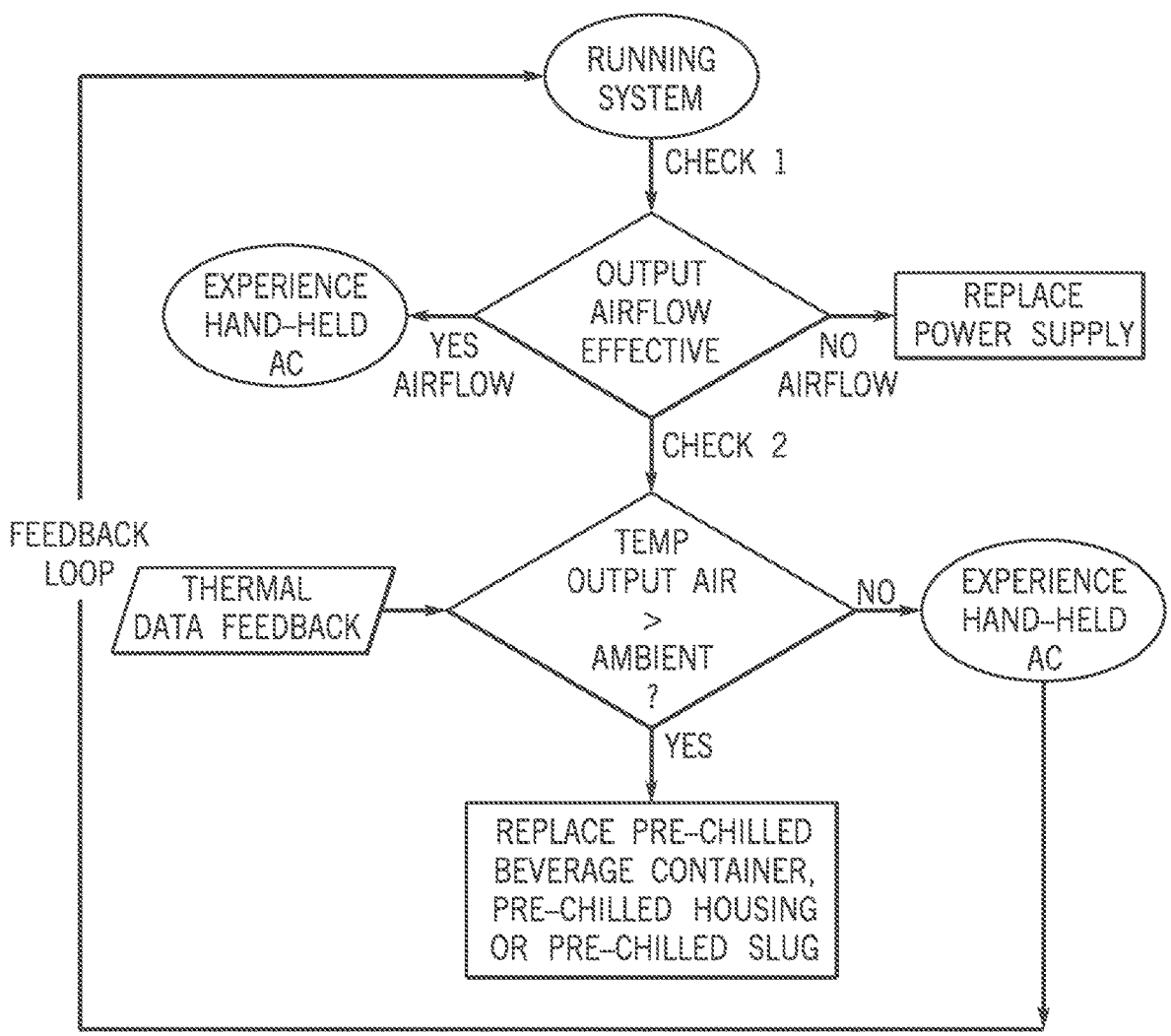

In an alternative embodiment, the thermal material 50 is located outside of the generally hollow spiral passageway 30. More specifically, although FIG. 13 illustrates the thermal material 50 located between the generally hollow spiral passageway 30 and the location where the pre-cooled beverage container 20 would be located, in the alternative embodiment, the generally hollow spiral passageway 30 is located between the thermal material 50 and the location where the pre-cooled beverage container 20 would be located.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A portable air conditioner comprising:
   a housing having a top, a bottom, a side and an interior;
   a first opening located on a top ridge of the housing wherein the first opening has a first side, a second side and a third side;
   a fan wherein the fan moves air located within the interior of the housing toward the top of the housing;
   a hollow passageway within the interior of the housing wherein the fan forces the air through the hollow passageway toward the first opening on the housing and out the first opening; and
   a second opening on the top of the housing wherein the second opening is larger than the first opening and where in the second opening extends into the interior of the housing;
   wherein the interior of the housing is capable of removably receiving and being completely occupied by a removable beverage container having an exterior surface;

wherein the removable beverage container acts as a fourth side of the first opening and wherein the air exits the first opening of the top ridge of the housing through the first opening when the removable beverage container is inserted into the interior of the housing;

wherein the exterior surface of the beverage container is in direct contact with the air when it passes through the first opening; and wherein the first opening forms an outlet of the hollow passageway such that air exits the hollow passageway of the housing through the first opening when the removable beverage container is located within the interior of the housing.

2. The portable air conditioner of claim 1 wherein the fan is located at the bottom of the housing.

3. The portable air conditioner of claim 1 wherein the fan is removable from the housing.

4. The portable air conditioner of claim 1 further comprising:
a thermal layer located within the interior of the housing wherein the thermal layer restricts the loss of cool air from the housing.

5. The portable air conditioner of claim 1 wherein the removable beverage container has a diameter similar to a diameter of the interior of the housing and wherein the removable beverage container fits within the interior of the housing and occupies the interior of the housing.

6. The portable air conditioner of claim 1 further comprising:
a cap which is rotated from a first position to a second position and wherein the cap covers the first opening of the housing in the first position and does not cover the first opening in the second position.

7. The portable air conditioner of claim 1 wherein the first opening is at the top of the housing.

8. The portable air conditioner of claim 1 wherein the hollow passageway is a spiral hollow passageway.

9. The portable air conditioner of claim 1 wherein a cross-section of the hollow passageway has a top, a bottom, a first side and a second side and wherein the top, the first side and the bottom of the cross-section of the hollow passageway are attached to and part of the housing and wherein the second side of the hollow passageway is made of a portion of the removable beverage container.

10. The portable air conditioner of claim 1 further comprising:
a docking station for securing and charging the fan.

11. The portable air conditioner of claim 1 further comprising:
a removable ring wherein the removable ring is secured to the top of the housing and wherein the removable ring alters the diameter of the second opening of the housing.

12. The portable air conditioner of claim 1 further comprising:
an opening at a bottom of the hollow passageway wherein the fan forces air first through the opening at the bottom of the hollow passageway and then toward the top of the housing and out the first opening of the housing.

13. A system for using a portable air conditioner comprising:
providing an air conditioner housing having a top, a bottom, a side and an interior;
providing a first opening located on a top ridge of the housing wherein the first opening has a first side, a second side and a third side;
providing a fan wherein the fan moves air located within the interior of the housing toward the top of the housing;
providing a hollow passageway within the interior of the housing wherein the fan forces the air through the hollow passageway toward the first opening on the housing;
providing a second opening on the top of the housing wherein the second opening is larger than the first opening and where in the second opening extends into the interior of the housing;
wherein the interior of the housing is capable of removably receiving and being completely occupied by a removable beverage container having an exterior surface;
wherein the removable beverage container acts as a fourth side of the first opening and wherein the air exits the first opening of the top ridge of the housing through the first opening when the removable beverage container is inserted into the interior of the housing and wherein the exterior surface of the beverage container is in direct contact with the air when it passes through the first opening and wherein the first opening forms an outlet of the hollow passageway such that air exits the hollow passageway of the housing through the first opening when the removable beverage container is located within the interior of the housing; and
cooling the housing prior to activating the fan.

14. The system for using a portable air conditioner of claim 13 further comprising:
providing a second opening of the housing wherein the second opening of the housing is located in the center of the housing wherein the second opening of the housing is capable of receiving a removable beverage container.

15. The system for using a portable air conditioner of claim 14 further comprising:
pre-cooling the removable beverage container in a refridgerator before placing the removable beverage container in the second opening of the housing.

* * * * *